(No Model.)
H. C. BRUNNER & H. HALL, Jr.
LET OFF DEVICE FOR THE SPOOLS OF BRAIDING OR OTHER MACHINES.
No. 425,857. Patented Apr. 15, 1890.
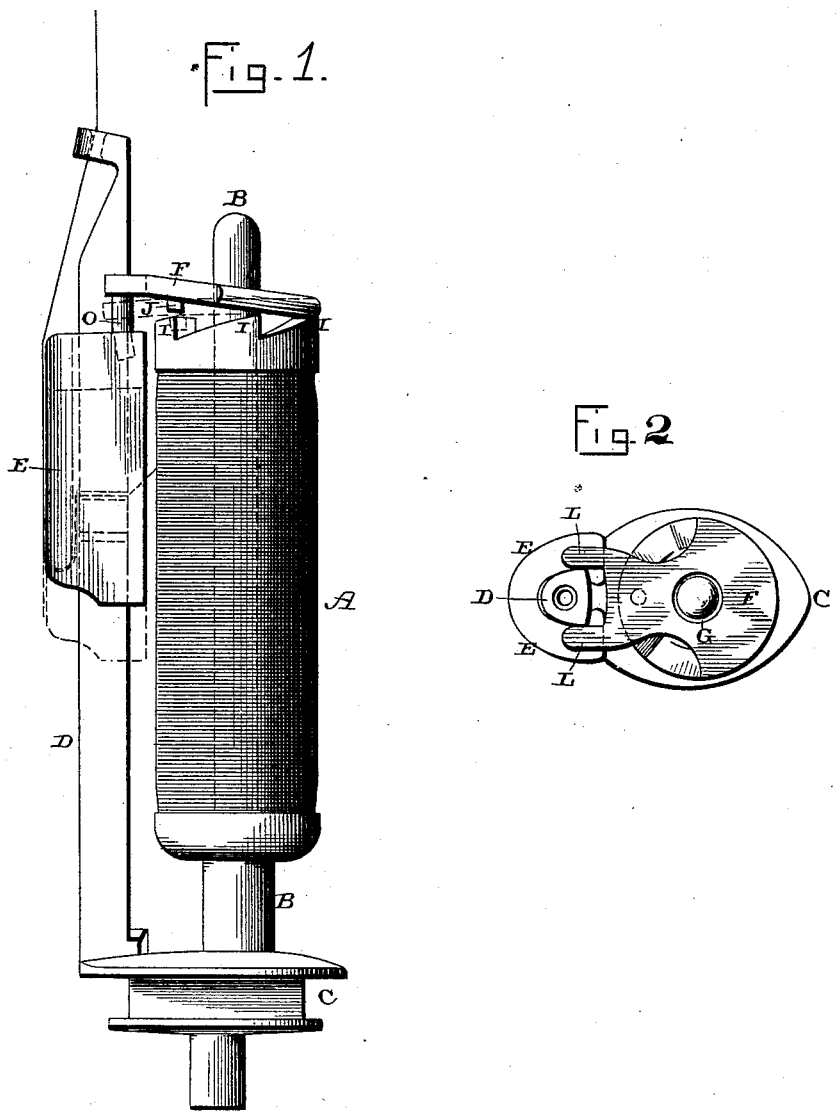
Witnesses:
E. P. Ellis,
L. J. Magie
Inventors:
H. C. Brunner,
Henry Hall, Jr.
per J. A. Lehmann, Atty

UNITED STATES PATENT OFFICE.

HENRY C. BRUNNER AND HENRY HALL, JR., OF HIGHLAND MILLS, NEW YORK.

LET-OFF DEVICE FOR THE SPOOLS OF BRAIDING AND OTHER MACHINES.

SPECIFICATION forming part of Letters Patent No. 425,857, dated April 15, 1890.

Application filed November 29, 1889. Serial No. 331,877. (No model.)

*To all whom it may concern:*

Be it known that we, HENRY C. BRUNNER and HENRY HALL, Jr., of Highland Mills, in the county of Orange and State of New York, have invented certain new and useful Improvements in Let-Off Devices for the Spools of Braiding and other Machines; and we do hereby declare the following to be a full, clear, and exact description of the invention, such as will enable others skilled in the art to which it pertains to make and use it, reference being had to the accompanying drawings, which form part of this specification.

Our invention relates to let-off devices for the spools of braiding and other machines; and it consists in the combination and arrangement of parts to be more fully described hereinafter, and particularly pointed out in the claims.

The object of our invention is to provide let-off devices by means of which a uniform tension on the yarn is maintained and an easy removal and displacement of the spool, tension-weight, and let-off device facilitated.

Figure 1 is a side elevation of let-off devices which embody our invention. Fig. 2 is a plan view of the same.

C represents the base, from which rises the spindle B and the guide D in the usual manner. Placed upon the spindle B is a spool A, such as is used in braiding-machines, and which turns freely upon the spindle in the usual manner. Upon the upper end of this spool are formed a series of ratchets or teeth I, with which the tooth or projection J on the under side of the let-off device F engages for the purpose of preventing the spool from turning backward.

This let-off device F consists of a plate or casting having a width about equal to the diameter of the ratchets upon the top of the spool, an opening G, through which the spindle loosely passes, the tooth J on its under side for engaging with the ratchet-teeth, prongs L upon its outer end, and downwardly-projecting points or extensions O on the under sides of the prongs, as shown. The prongs L catch upon opposite sides of the guide D, upon which a slide-weight E moves, and the upper end of this slide-weight strikes against the projections O when the tension upon the thread becomes sufficiently great to raise the weight. The upper end of the spindle B projects sufficiently far above the top of the spool A to allow the let-off device a suitable vertical play thereon. When the weight strikes against the projections O, it raises the pronged end of the let-off device and the let-off turns as upon a fulcrum and raises the tooth J sufficiently high to allow the spool to freely revolve upon the spindle for the purpose of allowing the yarn to be drawn off. The let-off device is made of the length here shown, so as to extend beyond the spindle and rest upon the bobbin-head on one side of its center and act as a lever and cause a quick action to drop or lock the spool and prevent the tension-weight E from falling down, and hence a much faster speed of the machine can be attained than when the let-off device is constructed in the usual manner.

A thread runs from the spool A through a hole in the guide D and around the tension-weight E, through which it leads through an opening in the top of the weight E, and, in connection with a number of spindles and spools, forms the fabric. Heretofore these let-off devices have been placed upon the guide D and made to project over the top of the spool far enough for a tooth to engage with the ratchets; but as here shown this let-off device is placed upon the spindle and is made long enough to catch upon opposite sides of the guide, so as to hold it in position, and then it is made to turn as upon a fulcrum when the weight E strikes against the downwardly-extending projections on the under side of the pronged ends.

Having thus described our invention, we claim—

1. The combination of the base, the spindle, the guide, the vertically-moving slide-weight, and the spool provided with teeth or ratchets, with a let-off device which is loosely placed upon the spindle and provided with prongs, so as to catch upon opposite sides of the guide, downwardly-extending projections at its end for the weight to strike against, and a tooth or projection between its ends and over the ratchets, so as to engage therewith, substantially as shown.

2. The combination, with the base, the guide, the spindle, the weight, and the spool provided with ratchets, of a let-off device loosely fitted upon the spindle, having its inner end bifurcated and engaging opposite sides of the guide, and a projection between its ends over the ratchets, whereby when the inner end of the device is engaged by the weight it turns as upon a fulcrum, so that the said tooth will release the spool, substantially as set forth.

3. The combination, with the base, the guide, the spindle, the weight, and the spool provided with ratchets upon its upper end, of a let-off device loosely fitting the spindle and one end thereof resting on the spool-head on one side of its center and its other end extending over the said weight, and having a projection between its ends which engages the said ratchets, whereby the end of the let-off device forms a fulcrum, substantially as shown.

In testimony whereof we affix our signatures in presence of two witnesses.

HENRY C. BRUNNER.
HENRY HALL, JR.

Witnesses:
ISAIAH T. HUNTER,
AUGS. E. WATSON.